(12) United States Patent
Harish

(10) Patent No.: US 8,191,428 B2
(45) Date of Patent: Jun. 5, 2012

(54) THERMAL EFFECT AND OFF-CENTER LOAD COMPENSATION OF A SENSOR

(75) Inventor: Divyasimha Harish, Union City, CA (US)

(73) Assignee: YPoint Capital, Inc., Fremont, CA (US)

( * ) Notice: Subject to any disclaimer, the term of this patent is extended or adjusted under 35 U.S.C. 154(b) by 669 days.

(21) Appl. No.: 11/965,737

(22) Filed: Dec. 28, 2007

(65) Prior Publication Data

US 2009/0167327 A1     Jul. 2, 2009

(51) Int. Cl.
*G01B 7/16*     (2006.01)
(52) U.S. Cl. ........................................................ 73/780
(58) Field of Classification Search .................... 351/47, 351/48, 57, 58, 44, 153, 158; 16/228; 73/780, 73/862.09, 760
See application file for complete search history.

(56) References Cited

U.S. PATENT DOCUMENTS

| | | | | | |
|---|---|---|---|---|---|
| 4,225,632 | A | * | 9/1980 | Ho | 427/79 |
| 5,463,388 | A | * | 10/1995 | Boie et al. | 341/33 |
| 5,969,243 | A | * | 10/1999 | Frey et al. | 73/335.04 |
| 6,267,009 | B1 | * | 7/2001 | Drewes et al. | 73/718 |
| 6,463,804 | B2 | * | 10/2002 | Matsumoto et al. | 73/514.32 |
| 6,491,647 | B1 | * | 12/2002 | Bridger et al. | 600/585 |
| 7,009,409 | B2 | * | 3/2006 | Davie et al. | 324/658 |
| 7,673,530 | B2 | * | 3/2010 | Harish | 73/862.626 |
| 2008/0169044 | A1 | * | 7/2008 | Osborne et al. | 141/1 |
| 2008/0190210 | A1 | * | 8/2008 | Harish et al. | 73/780 |
| 2009/0165572 | A1 | * | 7/2009 | Harish | 73/862.626 |

* cited by examiner

*Primary Examiner* — Max Noori
(74) *Attorney, Agent, or Firm* — Raj Abhyanker, P.C.

(57) ABSTRACT

A method and system of thermal effect and off-center load compensation of a sensor are disclosed. In one embodiment, a sensor includes a first conductive surface and a second conductive surface substantially parallel to the first conductive surface, a processing and communication zone of the first conductive surface and the second conductive surface having circuitry to enable communication with an external system (e.g., using a Universal Serial Bus (USB) interface) and a sensing area having partially a ceramic substrate surrounding a sensor surface and a reference surface of the first conductive surface and the second conductive surface. The sensor may include a set of electrical leads that enable the sensing area to communicate with the processing and communication zone and with external devices, and a guard ring surrounding the first conductive surface and the second conductive surface to minimize an effect of stray capacitance.

20 Claims, 8 Drawing Sheets

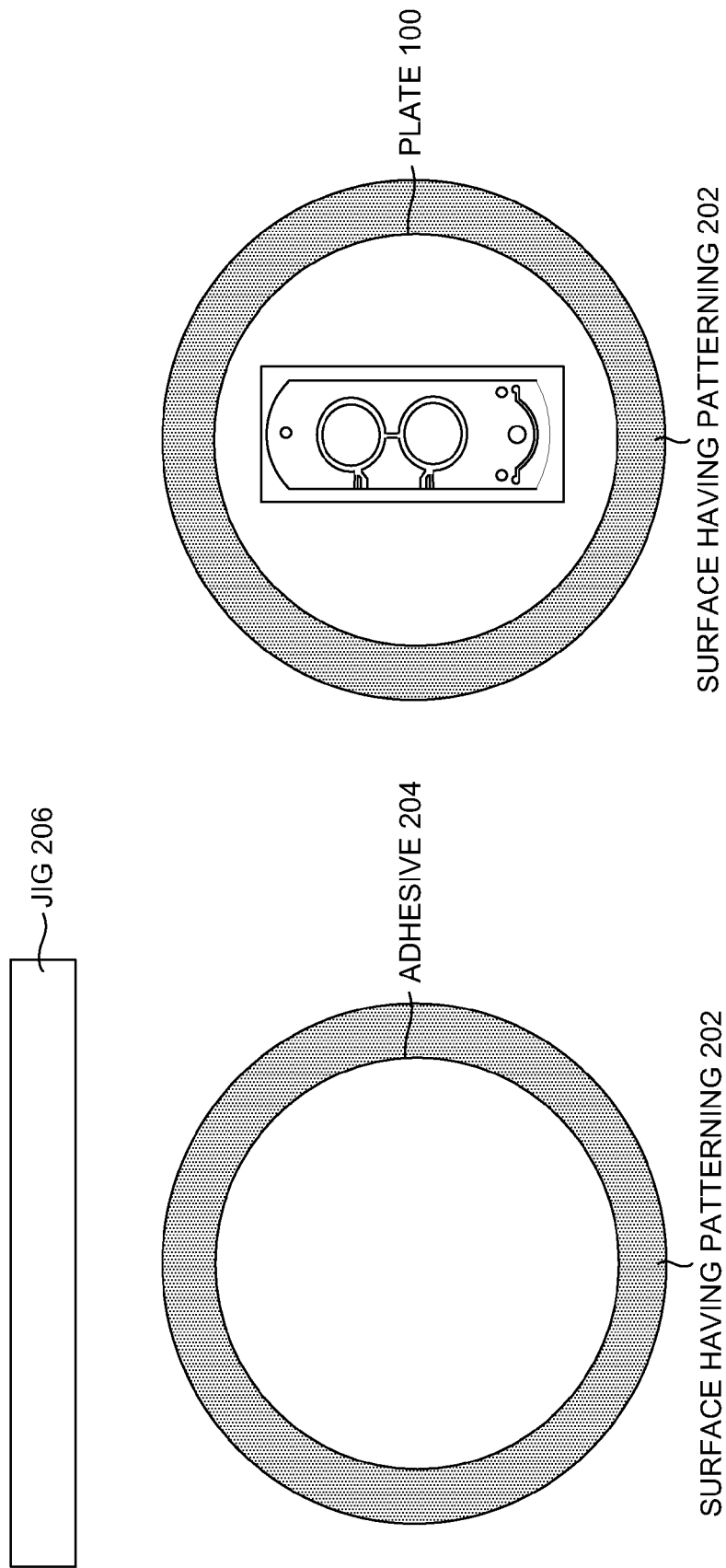

THERMAL EFFECT AND OFF-CENTER LOAD COMPENSATION OF A SENSOR

FIELD OF TECHNOLOGY

This disclosure relates generally to technical fields of measuring devices and, in one embodiment, to a thermal effect and off-center load compensation of a sensor.

BACKGROUND

A thermal effect (e.g., a thermal expansion and/or a thermal contraction caused by temperature change, heat, movement, etc.) may distort a measurement (e.g., a force reading, a strain reading, etc.) of a sensor (e.g., a load cell, a capacitive sensor, a strain gauge, etc.). For example, thermal expansion may be a tendency of matter to change in volume in response to a change in temperature. When the sensor is heated, its constituent particles may move around more and by doing so generally may maintain a greater average separation. The degree of expansion divided by the change in temperature can be referred to as a coefficient of thermal expansion (e.g., generally varies with temperature).

The thermal effect may cause a surface (e.g., a plate) of the sensor to move out of place. For example, the surface may expand when heat is present and/or may compress when the surface is cooled. The surface may not return to a previous location (e.g., because of the thermal expansion coefficient of the surface may be high, and/or may not be well matched to a housing of the sensor). As a result, a measurement (e.g., force reading, a capacitance, a resistance etc.) of the sensor may be altered because of the thermal effect. This may make the sensor inaccurate for use in certain conditions where high precision is required.

Similarly, sometimes a load (e.g., a force) may be placed on the surface of the sensor at an off-center location (e.g., not in the middle, on the edge, etc). The load may cause a tilt (e.g., a lean, an incline, a slope, a slant, etc.) of the surface of the sensor, and may result in an inaccurate measurement (e.g., an area between plates may be distorted because of the tilt in a capacitive sensor). As a result, the measurement of the sensor may be inaccurate because of both the thermal effect and the tilt.

SUMMARY

A method, apparatus, and system of thermal effect and off-center load compensation of a sensor are disclosed. In one aspect, a sensor includes a first conductive surface and a second conductive surface substantially parallel to the first conductive surface, a processing and communication zone of at least one of the first conductive surface and the second conductive surface having circuitry (e.g., may be a wireless enabled circuitry that enables the sensor to operate through a wireless network including a Bluetooth network, a WiFi network, and/or a ZigBee network) to enable communication with an external system (e.g., using a Universal Serial Bus (USB) interface) and a sensing area having at least partially a ceramic substrate surrounding at least one of a sensor surface and a reference surface of the first conductive surface and the second conductive surface.

A portion of the processing and communication zone and the sensing area may be fabricated with a FR4 printed circuit board material adjacent to the ceramic substrate to reduce cost of manufacture of the sensor. In addition, the sensor may include a set of electrical leads that enable the sensing area to communicate with the processing and communication zone and with external devices. A guard ring may surround the first conductive surface and the second conductive surface to minimize an effect of stray capacitance.

The ceramic substrate may be created essentially from alumina created through a form of aluminum oxide, Al2O3, occurring naturally as corundum, in a hydrated form in bauxite, and/or with various impurities among which include ruby, sapphire, and/or emery. In addition, the ceramic substrate may have a low thermal expansion coefficient that is well matched to a housing (e.g., may be a stainless steel material) of the sensor.

The sensor may also include a film material to bond the ceramic substrate to the housing of the sensor after a roughness pattern (e.g., spiral grove pattern) is introduced on the housing to better secure the bond between the ceramic substrate and the housing of the sensor. The film may provide a more linear thermal characteristic thereby making error correction of the sensor simpler. A jig having a preset force may be applied to the ceramic substrate and the housing to minimize hysteresis of the sensor (e.g., the film may compresses from 3 mils to 1 mil when 350 degrees F. temperature is applied for 10 minutes using a thermoset process).

The ceramic substrate may be attached to the housing three stainless steel spacers of 10 mils a piece. A glass layer may be created between the housing and the ceramic substrate such that ceramic substrate rests above the glass layer separating it from the housing. The ceramic substrate may be directly fused to the housing a 900 degree F. temperature process optimized to minimize air bubbles between the ceramic substrate and the housing. Multiple sensing zones may make up the sensor surface to minimize tilt in case of off-center loading.

A curved surface of the sensor surface, first conductive surface, and/or the second conductive surface may keep an area between a set of plates predictable when off-center loading occurs. In addition, the sensor may include a double-diaphragm sensor with a hollow interior cavity housing surrounding a solid central portion to minimize tilt effects due to off-center loading, wherein the double diaphragm sensor has physical properties of a three dimensional four bar linkage swept across an axis.

In another aspect, a method includes surrounding a sensing area of a sensor with a ceramic material that has a thermal coefficient of expansion which is well matched to a housing of the sensor, applying a film to secure the sensing area and the ceramic material to a housing of the sensor and reducing a tilt that affects a measurement of the sensor by creating a double-diaphragm pattern of the housing and curving a plate of the sensing area such that the area between the plate and another plate does not substantially change when an off-center load is applied at any location on the sensor. The method may further include fabricating a portion of the processing and communication zone and/or the sensing area with a FR4 printed circuit board material adjacent to the ceramic substrate to reduce cost of manufacture of the sensor. The method may also include creating a roughness pattern (e.g., a spiral grove pattern) on the housing to better secure a bond between the ceramic substrate and the housing of the sensor. The film may provide a more linear thermal characteristic thereby making error correction of the sensor simpler.

In yet another aspect, a sensor may include a ceramic substrate surrounding a sensor surface and a reference surface of the sensor, a film material to bond the ceramic substrate to a housing of the sensor after a roughness pattern is introduced on the housing to better secure the ceramic substrate and the housing of the sensor and a hollow interior cavity of the sensor in a double-diaphragm form (e.g., having physical properties of a three dimensional four bar linkage swept across an axis) surrounding a solid central portion to minimize tilt effects due to off-center loading.

The sensor may also include curved surface of the sensor surface to keep an area between a set of plates predictable when off-center loading occurs. The change in the distance may be caused by a load applied to the surface above the first conductive surface with respect to the sound conductive surface. A change in capacitance of the variable capacitor may be inversely proportional to the change in the distance between the first conductive surface and the second conductive surface. The method may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 2C and 2D is a two dimensional cross-sectional views of a surface having patterning along with a jig, according to one embodiment.

Figure 1A:
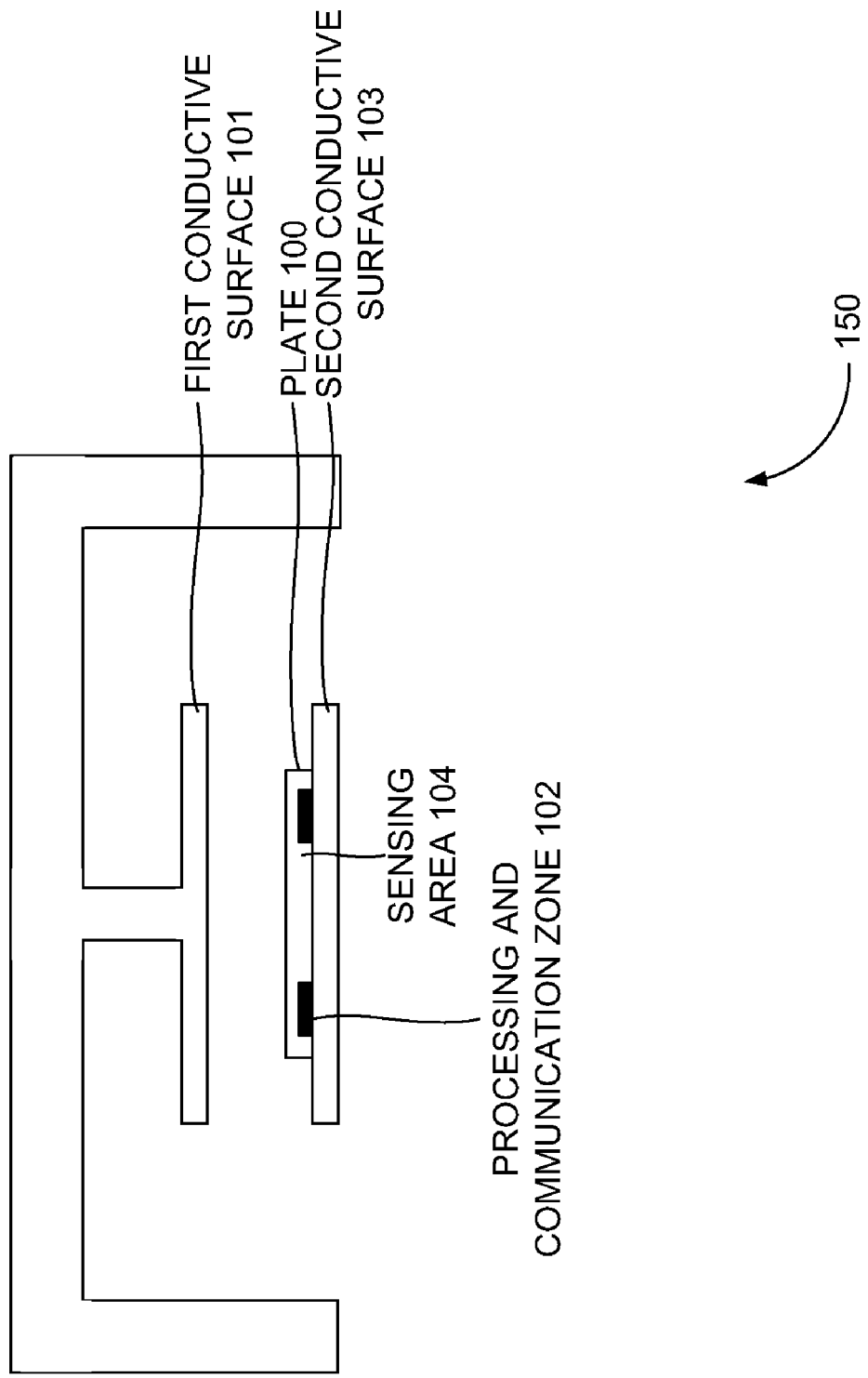
FIG. 1A is a two dimensional cross-sectional view of a sensor formed with a plate having inserted between the set of plates a first conductive surface and a second conductive surface, according to one embodiment.

Other features of the present embodiments will be apparent from the accompanying drawings and from the detailed description that follows.

DETAILED DESCRIPTION

A method, apparatus and system of thermal effect and off-center load compensation of a sensor are disclosed. In the following description, for purposes of explanation, numerous specific details are set forth in order to provide a thorough understanding of the various embodiments. It will be evident, however, to one skilled in the art that the various embodiments may be practiced without these specific details.

In one embodiment, a sensor includes a first conductive surface and a second conductive surface (e.g., the first conductive surface 101 and the second conductive surface 103 of FIG. 1) substantially parallel to the first conductive surface, a processing and communication zone (e.g., the processing and communication zone 102 of FIG. 1) of the first conductive surface 101 and the second conductive surface 103 having circuitry to enable communication with an external system and a sensing area (e.g., the sensing area 104 of FIG. 1) having partially a ceramic substrate (e.g., the ceramic substrate 106 of FIG. 1) surrounding a sensor surface (e.g., the sensor surface 108 of FIG. 1) and a reference surface (e.g., the reference surface 110 of FIG. 1) of the first conductive surface 101 and the second conductive surface 103.

In another embodiment, a method includes surrounding a sensing area 104 of a sensor 150 with a ceramic material that has a thermal coefficient of expansion which is well matched to a housing of the sensor, applying a film to secure the sensing area 104 and the ceramic material to a housing of the sensor and reducing a tilt that affects a measurement of the sensor 350 by creating a double-diaphragm (e.g., the double-diaphragm 302 of FIG. 3) pattern of the housing and curving a plate (e.g., the plate 100 of FIG. 1) of the sensing area 104 such that the area between the plate 100 and another plate 100 does not substantially change when an off-center load is applied at any location on the sensor 350.

In yet another embodiment, a sensor 350 includes a ceramic substrate 106 surrounding a sensor surface 108 and a reference surface 110 of the sensor 150, a film material to bond the ceramic substrate 106 to a housing of the sensor after a roughness pattern is introduced on the housing to better secure the ceramic substrate 106 and the housing of the sensor 150 and a hollow interior cavity (e.g., the hollow interior cavity 604 of FIG. 6) of the sensor 150 in a double-diaphragm form (e.g., the double-diaphragm form 650 of FIG. 6) having physical properties of a three dimensional four bar linkage swept across an axis) surrounding a solid central portion (e.g., the solid central portion 606 of FIG. 6) to minimize tilt effects due to off-center loading.

FIG. 1A is a two dimensional cross-sectional view of a sensor 150 formed with a plate 100 having inserted between the set of plates a first conductive surface 101 and a second conductive surface 103 (e.g., creating a sensing area 104 and a processing and communication zone 102 as illustrated in FIG. 1A), according to one embodiment. Particularly FIG. 1A illustrates the plate 100, the first conductive surface 101, the processing and communication zone 102, the second conductive surface 103 and the sensing area 104, according to one embodiment.

For example, the sensor device may be created through the plate 100 that is inserted (e.g., sandwiched) in an upper conductive surface and a lower conductive surface by creating the sensing area 104 and the processing and communication zone 102 of FIG. 1A. In one embodiment, the two parallel conductive surfaces are substantially parallel to each other and have the same physical area and/or thickness.

Figure 1B:
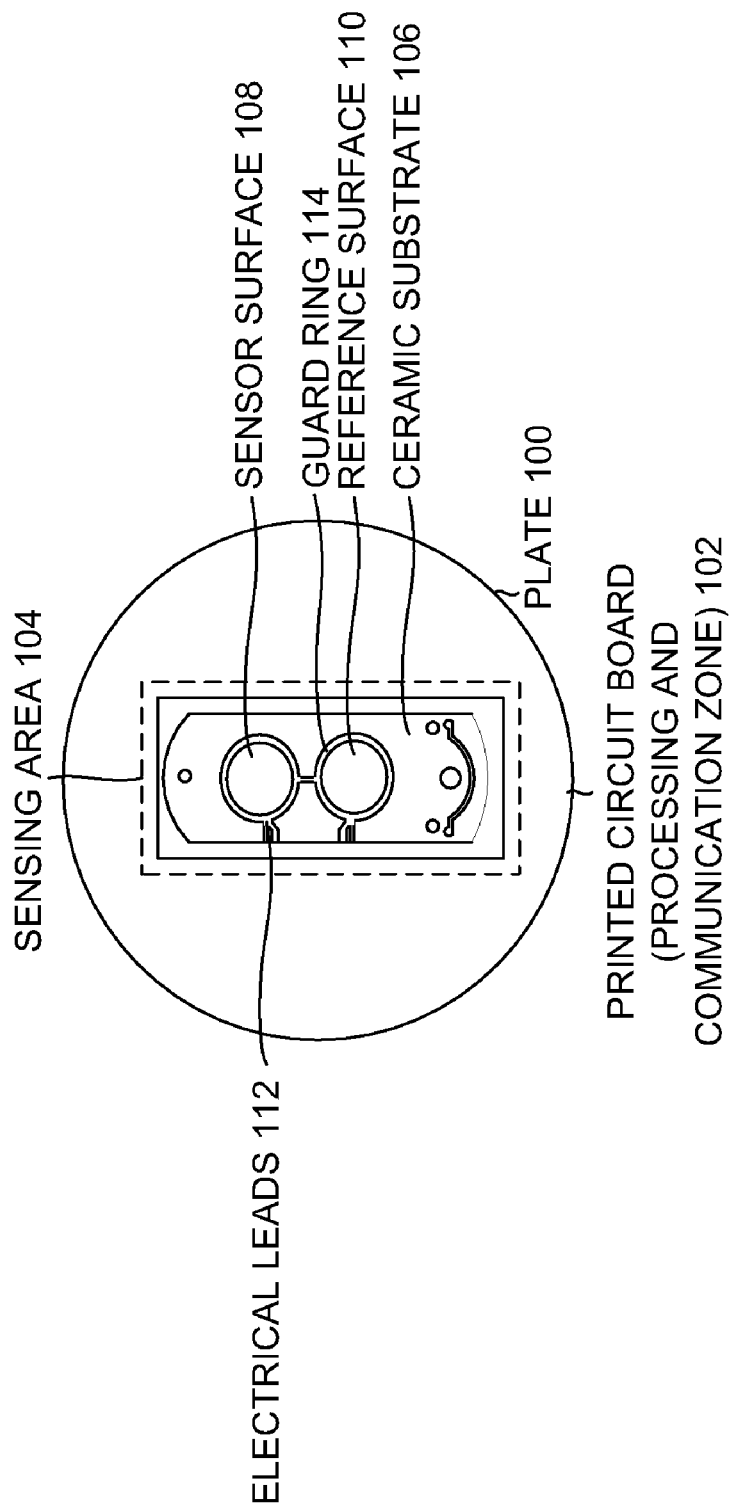
FIG. 1B is a two dimensional cross-sectional view of a sensor device having a ceramic substrate for a printed circuit board (PCB), according to one embodiment.

FIG. 1B is a two dimensional cross-sectional view of a sensor device having a ceramic substrate 106 for a printed circuit board (PCB) 102, according to one embodiment. In an example embodiment illustrated in FIG. 1B, the sensor 150 (e.g., a load cell, a capacitor sensor, a strain gauge, etc.) includes a plate 100, the printed circuit board (processing and communication zone) 102, a sensing area 104, the ceramic substrate 106, a sensor surface 108, a reference surface 110, electrical leads 112 and a guard ring 114.

The sensor 150 may also have various zones like the processing and communication zone 102 (e.g., having the first conductive surface 101 and the second conductive surface 103 of FIG. 1A), the sensing area 104 and external devices which communicates with each other through a set of electrical leads 112 and the guard ring 114 surrounding the first conductive surface 101 and the second conductive surface 103 to minimize an effect of stray capacitance. The electrical leads 112 may go from a ceramic board to measurement electronics on the sensor 150.

In one embodiment, the sensing area 104 may have the ceramic substrate 106 partially surrounding the sensor surface 108 and the reference surface 110 of the first conductive surface 101 and the second conductive surface 103. For example, the sensor 150 may use the ceramic substrate 106 in areas having a capacitive surface or sensing zones instead of using FR4 for a printed circuit board (PCB) material. The ceramic material may be encompassed by a guard layer above and below it. The ceramic material may have a thermal expansion coefficient that is well matched to a housing (e.g., which may include the top plate, the bottom plate, the contact zone, and/or a different structure) of the sensor 150.

For example, the thermal expansion coefficient may be a degree of expansion divided by the change in temperature which generally varies (e.g., high, low, etc.) with temperature. The ceramic material may essentially be alumina since it has low thermal expansion coefficient. The ceramic substrate 106 may give better measurement repeatability (e.g., a force reading, a strain reading, etc.) and better thermal characteristics because of the lower thermal expansion coefficient.

In one embodiment, the processing and communication zone 102 of the first conductive surface 101 and the second conductive surface 103 may be having circuitry (e.g., may be wireless enabled circuitry that enables the sensor 150 to operate through a wireless network including a Bluetooth network, a WiFi network, and/or a ZigBee network) to enable communication with an external system (e.g., using the Universal Serial Bus (USB) interface).

The sensing area 104 may be having partially the ceramic substrate 106 (e.g., includes essentially of alumina created through a form of aluminum oxide, Al2O3, occurring naturally as corundum, in a hydrated form in bauxite, and/or with various impurities among which include ruby, sapphire, and/or emery, etc.) surrounding the sensor surface 108 and the reference surface 110 of the first conductive surface 101 and the second conductive surface 103. For example, the ceramic substrate 106 may have a low thermal expansion coefficient that is well matched to a housing of the sensor 150 and the housing of the sensor may be a stainless steel material.

The ceramic substrate 106 may be surrounding the sensor surface 108 and the reference surface 110 of the sensor 150. A set of electrical leads 112 may enable the sensing area 104 to communicate with the processing and communication zone 102 and with external devices. The guard ring 114 surrounding the first conductive surface 101 and the second conductive surface 103 may minimize an effect of stray capacitance.

The sensing area 104 of the sensor 150 may be surrounded with a ceramic material that has a thermal coefficient of expansion which is well matched to the housing of the sensor. A portion of the processing and communication zone 102 and the sensing area 104 may be fabricated with a FR4 printed circuit board material adjacent to the ceramic substrate 106 to reduce cost of manufacture of the sensor 150.

Figure 2B:
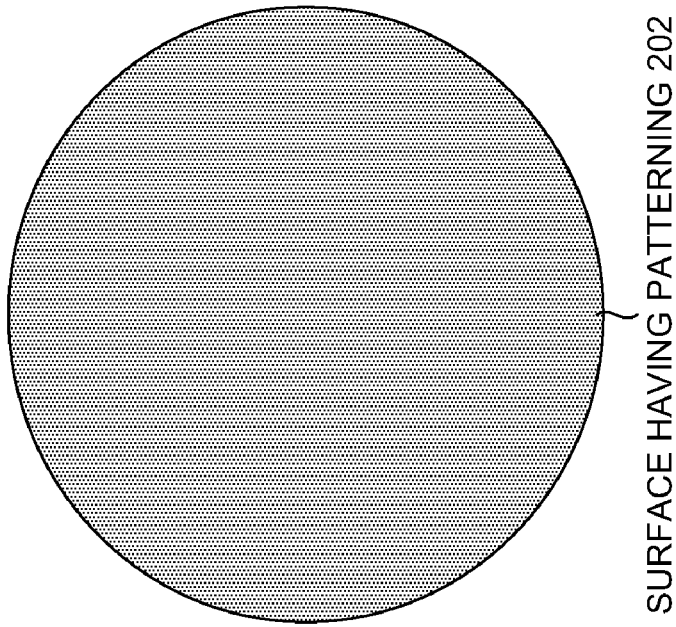
FIGS. 2A and 2B is a two dimensional cross-sectional views of a surface and a surface having patterning, according to one embodiment.
Figure 2A:
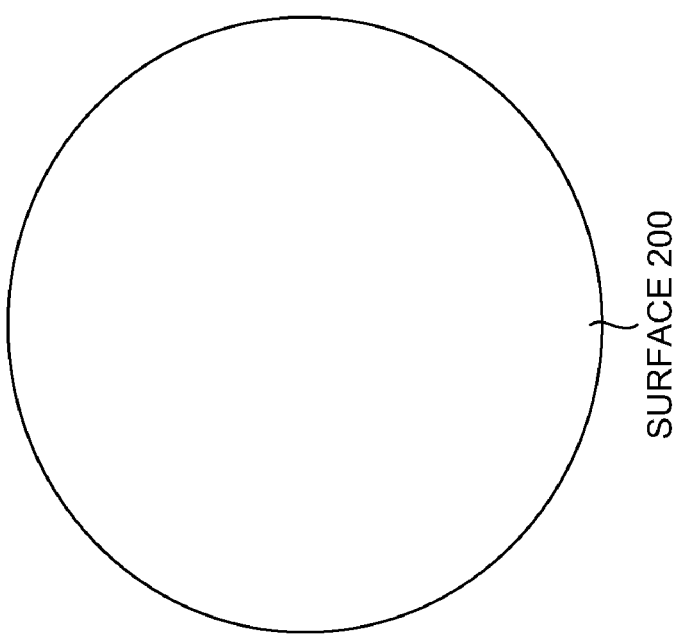

FIGS. 2A and 2B is a two dimensional cross-sectional views of a surface 200 and a surface having patterning 202, according to one embodiment. The example embodiment illustrated in FIG. 2A includes a two dimensional cross-sectional view of the surface 200 (e.g., maybe the bottom surface of the sensor) without any roughness.

FIG. 2B is a two dimensional cross-sectional view of the surface having patterning 202. A film material may be used to bond in between the ceramic structure and the bottom surface having the housing (e.g., made using the stainless steel) of the sensor. A surface roughness having a spiral grove pattern (and/or any other pattern) may be introduced on the bottom surface so that the bond is stronger between the ceramic structure and the bottom surface. In one embodiment, a roughness pattern (e.g., the spiral grove pattern) may be created on the housing to better secure a bond between the ceramic substrate (e.g., the ceramic substrate 106 of FIG. 1) and the housing of the sensor.

FIGS. 2C and 2D are two dimensional cross-sectional views of a surface having patterning 202 along with a jig 206, according to one embodiment. In the example embodiment illustrated in FIG. 2C, a two dimensional cross-sectional view of a surface having patterning 202 with adhesive 204 on the top along with the jig 206 is shown. FIG. 2D is a two dimensional cross-sectional views of a surface having patterning 202 with the plate 100 on top. The plate 100 having ceramic substrate 106 is illustrated as being placed above the surface having patterning 202 (e.g., a bottom surface, a base plate, a floor, a surface, a sidewall, a housing surface, etc.). The adhesive 204 may be a film material used to bond the plate 100 having the ceramic substrate 106 with the surface having patterning 202.

In another embodiment, a two dimensional cross-sectional view of the jig 206 is displayed along with the surface having patterning 202. For example, the jig 206 having a preset force may be applied to the sensor (e.g., the sensor 150 of FIG. 1) to bond the ceramic substrate 106 on the top of the upper plate 100, the adhesive 204 (e.g., film) and the surface having patterning 202 which is the bottom surface of the upper housing. This may cause the housing to minimize the hysteresis of the sensor. The film to compress from 3 mils to 1 mil when 350 degrees F. temperature is applied for 10 minutes using a thermoset process. As such, the film may provide more linear thermal characteristics making error correction of the sensor simpler.

For example, the bonding may take places in various ways such as the housing can be attached to the ceramic substrate 106 using three stainless steel spacers of 10 mils a piece. Alternatively, a glass layer may be created between the housing and the ceramic substrate 106 such that ceramic substrate 106 rests above the glass layer separating it from the housing. The ceramic substrate 106 may be directly fused to the housing a 900 degree F. temperature process optimized to minimize air bubbles between the ceramic substrate 106 and the housing.

In one embodiment, the film material (e.g., the adhesive 204 of FIG. 2C) may be used to bond the ceramic substrate (e.g., the ceramic substrate 106 of FIG. 1) to the housing of the sensor after a roughness pattern (e.g., the spiral grove pattern) is introduced on the housing to better secure the bond between the ceramic substrate 106 and the housing of the sensor. The film may be applied to secure the sensing area (e.g., the sensing area 104 of FIG. 1) and the ceramic material to the housing of the sensor.

Figure 3:
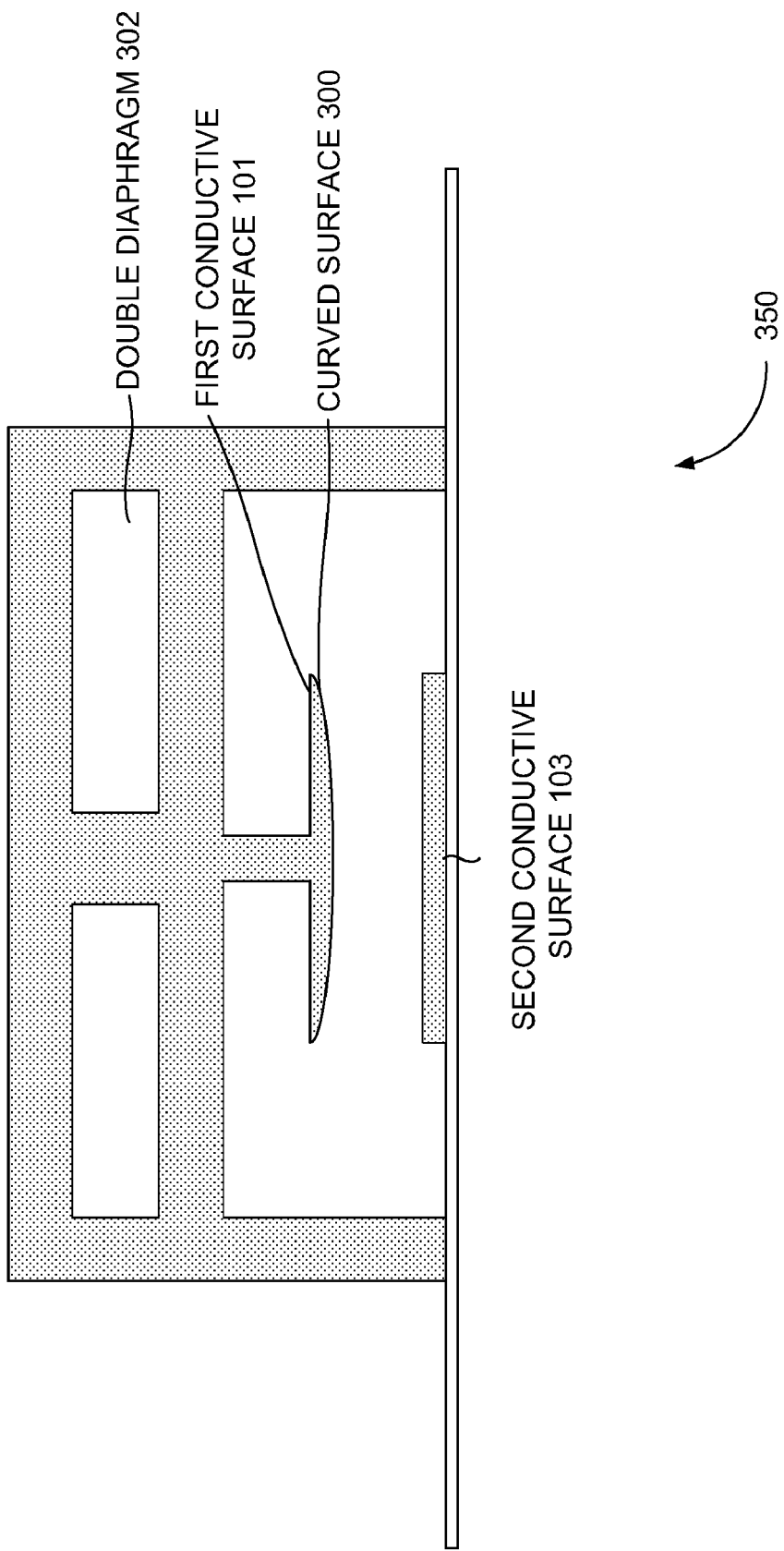
FIG. 3 is a two dimensional schematic view of a sensor, according to one embodiment.

FIG. 3 is a two dimensional schematic view of a sensor 350, according to one embodiment. In the example embodiment illustrated in FIG. 3, the first conductive surface 101, the second conductive surface 103, a curved surface 300 and a double-diaphragm 302 is shown. The sensor 350 may be made up of multiple sensing zones such as the processing and communicating zone 102 and the sensing area 104. For example, sometimes a load (e.g., a preset force) using the jig 206 may be placed on the surface of the sensor 350 at an off-center location (e.g., not in the middle, on the edge, etc). The load may cause a tilt (e.g., a lean, an incline, a slope, a slant, etc.) of the surface of the sensor 350, and may result in an inaccurate measurement (e.g., an area between plates may be distorted because of the tilt in the sensor 350).

As a result, the measurement of the sensor 350 may be inaccurate because of both the thermal effect (e.g., a thermal expansion and/or a thermal contraction caused by temperature change, heat, movement, etc.) and the tilt. Thus effects of off-center loading may include the creation of a momentum having a tendency to cause rotation about a point or an axis when the off-center load is placed.

Multiple sensing zones may be used in the sensor 350 to minimize tilt due to off-center loading. In addition, the sensor surface 108 and the reference surface 110 may be curved (e.g., rounded, oval, etc.) to keep an area between a set of plates predictable when off-center loading occurs. The double-diaphragm 302 may also be introduced in the sensor with a hollow interior cavity (e.g., the hollow interior cavity 604 of FIG. 6) housing surrounding a solid central portion 606 to minimize tilt effects due to off-center loading, wherein the double diaphragm sensor has physical properties of a three dimensional four bar linkage swept across an axis.

In one embodiment, a curved surface (e.g., the curved surface 300 of FIG. 3) of the sensor surface (e.g., the sensor surface 108 of FIG. 1), first conductive surface 101, and/or the second conductive surface 103 may be used to keep an area between a set of plates (e.g., the plate 100 of FIG. 1) predictable when off-center loading occurs.

The double-diaphragm 302 housing of the sensor may have a hollow interior cavity housing surrounding a solid central portion (e.g., the solid central portion 606 of FIG. 6) to minimize tilt effects due to off-center loading, wherein the double diaphragm sensor has physical properties of a three dimensional four bar linkage swept across an axis. The tilt that affects a measurement of the sensor 350 may be reduced by creating the double-diaphragm 302 pattern of the housing and curving a plate (e.g., the plate of FIG. 1) of the sensing area (e.g., the sensing area 104 of FIG. 1) such that the area between the plates does not substantially change when the off-center load is applied at any location on the sensor 350.

Figure 4:
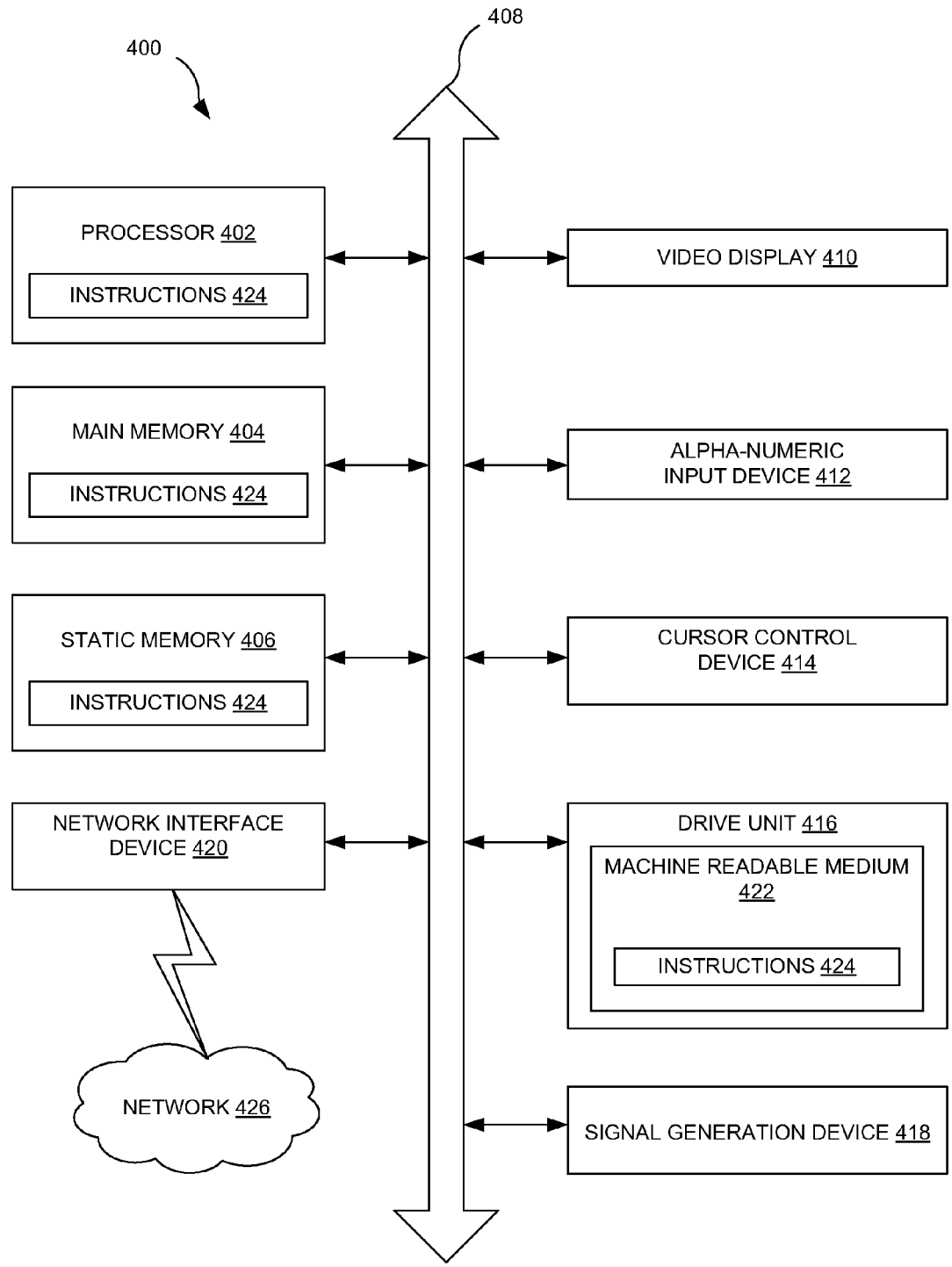
FIG. 4 is a diagrammatic representation of a computer system capable of processing a set of instructions to perform any one or more of the methodologies herein, according to one embodiment.

FIG. 4 is a diagrammatic representation of a computer system 400 capable of processing a set of instructions to perform any one or more of the methodologies herein, according to one embodiment. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 400 includes a processor 402 (e.g., a central processing unit (CPU) a graphics processing unit (GPU) and/or both), a main memory 404 and a static memory 406, which communicate with each other via a bus 408. The computer system 400 may further include a video display unit 410 (e.g., a liquid crystal display (LCD) and/or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies and/or functions described herein. The software 424 may also reside, completely and/or at least partially, within the main memory 404 and/or within the processor 402 during execution thereof by the computer system 400, the main memory 404 and the processor 402 also constituting machine-readable media.

The software 424 may further be transmitted and/or received over a network 426 via the network interface device 420. While the machine-readable medium 422 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 5:
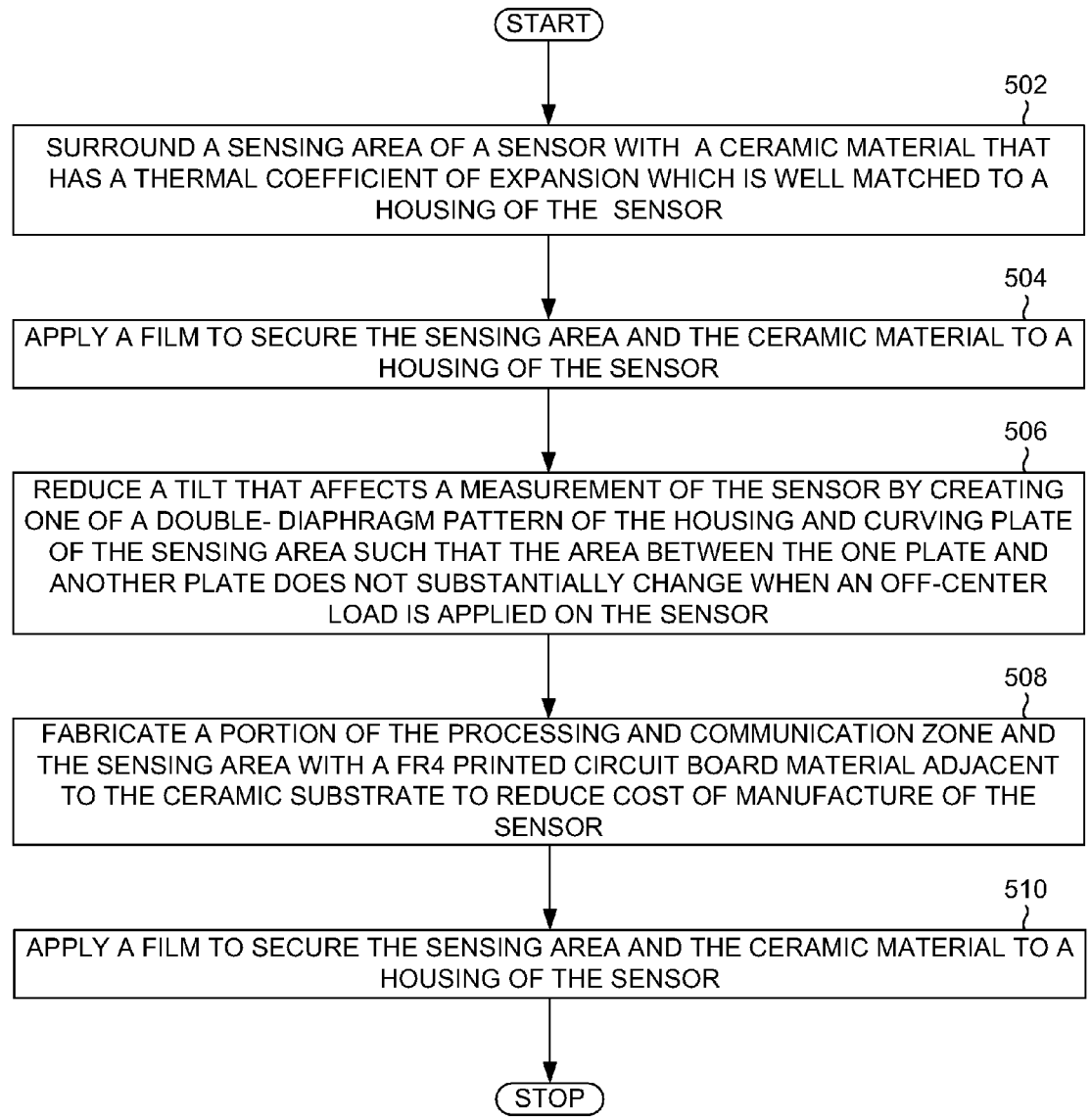
FIG. 5 is a process flow of securing a bond between the ceramic substrate and a housing of the sensor, according to one embodiment.

FIG. 5 is a process flow of securing a bond between a ceramic substrate (e.g., the ceramic substrate 106 of FIG. 1) and a housing of a sensor (e.g., a load cell, a capacitor sensor, a strain gauge, etc.), according to one embodiment. In operation 502, a sensing area (e.g., the sensing area 104 of FIG. 1) of the sensor (e.g., the sensor 150 of FIG. 1) may be surrounded with a ceramic material that has a thermal coefficient of expansion which is well matched to a housing of the sensor. In operation 504, a film (e.g., the film provides a more linear thermal characteristic thereby making error correction of the sensor simpler) may be applied to secure the sensing area 104 and the ceramic material to the housing of the sensor (e.g., as illustrated in FIG. 2C).

In operation 506, a tilt that affects a measurement of the sensor 350 may be reduced by creating a double-diaphragm (e.g., the double-diaphragm 302 of FIG. 3) pattern of the housing and curving plate (e.g., the plate 100 of FIG. 1) of the sensing area 104 such that the area between the plate 100 and another plate 100 does not substantially change when an off-center load is applied on the sensor (e.g., as illustrated in FIG. 3). In operation 508, a portion of the processing and communication zone (e.g., the processing and communication zone 102 of FIG. 1) and the sensing area 104 may be fabricated with a FR4 printed circuit board 102 material adjacent to the ceramic substrate 106 to reduce cost of manufacture of the sensor (e.g., the sensor 150 of FIG. 1). In operation 510, a roughness pattern (e.g., spiral grove pattern) may be created on the housing to better secure a bond between the ceramic substrate 106 and the housing of the sensor.

Figure 6:
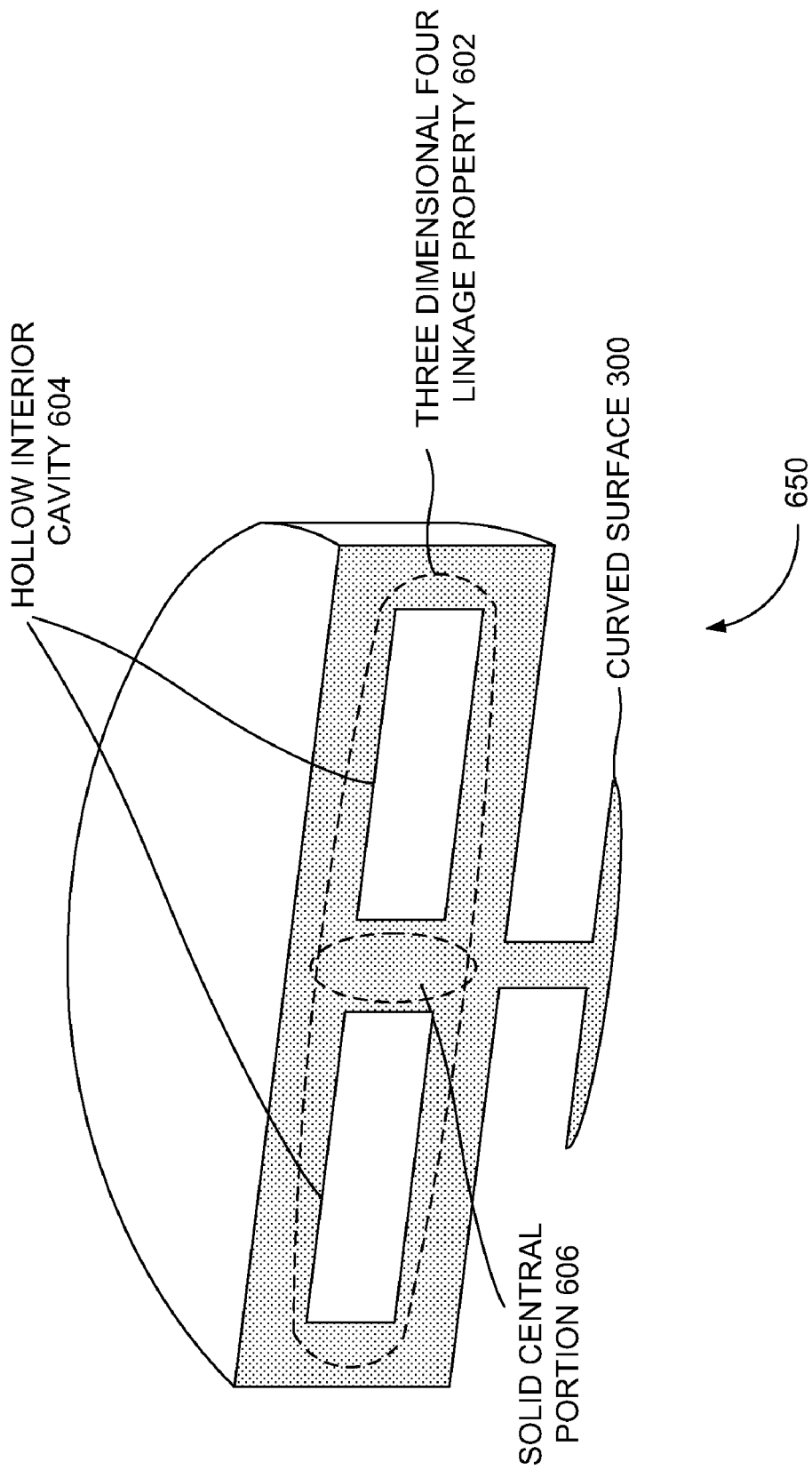
FIG. 6 is a three-dimensional cross-section view of a double-diaphragm form, according to one embodiment.

FIG. 6 is a three-dimensional cross section view of a double-diaphragm form 650, according to one embodiment. In the example embodiment illustrated in FIG. 6, a three dimensional cross-sectional view may display the curved surface 300, a three dimensional four bar linkage property 602, a hollow interior cavity 604 and a solid central portion 606, according to one embodiment. In one embodiment, a hollow interior cavity 604 of the sensor 150 in the double-diaphragm form 650 (e.g., having physical properties of the three dimensional four bar linkage swept across an axis) surrounding a solid central portion 606 to minimize tilt effects due to off-center loading.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A sensor, comprising:

a first conductive surface;

a second conductive surface substantially parallel to the first conductive surface;

a processing and communication zone of at least one of the first conductive surface and the second conductive surface having circuitry to enable communication with an external system; and a sensing area having at least partially a ceramic substrate surrounding at least one of a sensor surface and a reference surface of the at least one of the first conductive surface and the second conductive surface, wherein a jig having a preset force is configured to be applied to the ceramic substrate and a housing of the sensor to minimize hysteresis of the sensor.

2. The sensor of claim 1, wherein the circuitry to enable communication with the external system comprises a Universal Serial Bus (USB) interface.

3. The sensor of claim 1, wherein the circuitry is a wireless enabled circuitry that enables the sensor to operate through a wireless network including at least one of a Bluetooth® network, a WiFi™ network, and a ZigBee™ network.

4. The sensor of claim 1, wherein a portion of at least one of the processing and communication zone and the sensing area is fabricated with a FR4 printed circuit board material adjacent to the ceramic substrate to reduce a cost of manufacture of the sensor.

5. The sensor of claim 1, further comprising:
a set of electrical leads that enable the sensing area to communicate with the processing and communication zone and with at least one external device, and
a guard ring surrounding the at least one of the first conductive surface and the second conductive surface to minimize an effect of stray capacitance.

6. The sensor of claim 1, wherein the ceramic substrate comprises alumina created through a form of aluminum oxide, $Al_2O_3$, occurring naturally as corundum, in a hydrated form in bauxite, and with various impurities including ruby, sapphire, and emery.

7. The sensor of claim 1,
wherein the ceramic substrate has a low thermal expansion coefficient that is well matched to the housing of the sensor, and
wherein the housing of the sensor comprises a stainless steel material.

8. The sensor of claim 1, wherein a film material bonds the ceramic substrate to the housing of the sensor after a roughness pattern is introduced on the housing to better secure the bond between the ceramic substrate and the housing of the sensor, the film material providing for a more linear thermal characteristic, thereby making error correction of the sensor simpler.

9. The sensor of claim 8, wherein the roughness pattern is a spiral groove pattern.

10. The sensor of claim 1, wherein the ceramic substrate is attached to the housing using three stainless steel spacers of 10 mils a piece.

11. The sensor of claim 1, wherein a glass layer is created between the housing and the ceramic substrate such that the ceramic substrate rests above the glass layer separating the ceramic substrate from the housing.

12. The sensor of claim 1, wherein the ceramic substrate is directly fused to the housing using a 900 degree F. temperature process optimized to minimize air bubbles between the ceramic substrate and the housing.

13. The sensor of claim 1, wherein multiple sensing zones make up the sensor surface to minimize tilt in case of off-center loading.

14. The sensor of claim 13, further comprising a curved surface of at least one of the sensor surface, first conductive surface, and the second conductive surface to keep an area between a set of plates predictable when the off-center loading occurs.

15. The sensor of claim 13, further comprising a double-diaphragm sensor with a hollow interior cavity housing surrounding a solid central portion to minimize tilt effects due to the off-center loading, the double-diaphragm sensor having physical properties of a three dimensional four bar linkage swept across an axis.

16. A sensor, comprising:
a first conductive surface;
a second conductive surface substantially parallel to the first conductive surface;
a processing and communication zone of at least one of the first conductive surface and the second conductive surface having circuitry to enable communication with an external system;
a set of electrical leads that enable the sensing area to communicate with the processing and communication zone and with at least one external devices;
a guard ring surrounding the at least one of the first conductive surface and the second conductive surface to minimize an effect of stray capacitance; and
a sensing area having at least partially a ceramic substrate surrounding at least one of a sensor surface and a reference surface of the at least one of the first conductive surface and the second conductive surface,
wherein a jig having a preset force is configured to be applied to the ceramic substrate and the housing to minimize hysteresis of the sensor.

17. The sensor of claim 16, wherein at least one of:
a film material bonds the ceramic substrate to the housing of the sensor after a roughness pattern is introduced on the housing to better secure the bond between the ceramic substrate and the housing of the sensor,
the roughness pattern is a spiral groove pattern, and
the film material provides for a more linear thermal characteristic, thereby making error correction of the sensor simpler.

18. A sensor, comprising:
a ceramic substrate surrounding at least one of a sensor surface and a reference surface of the sensor; and
a film material to bond the ceramic substrate to a housing of the sensor after a roughness pattern is introduced on the housing to better secure the ceramic substrate and the housing of the sensor,
wherein the sensor includes a hollow interior cavity in a double-diaphragm form surrounding a solid central portion to minimize tilt effects due to off-center loading, the double-diaphragm form having physical properties of a three dimensional four bar linkage swept across an axis.

19. The sensor of claim 18, wherein at least one of:
the roughness pattern is a spiral groove pattern, and
the film material provides for a more linear thermal characteristic, thereby making error correction of the sensor simpler.

20. The sensor of claim 18, wherein at least one of:
a jig having a preset force is configured to be applied to the ceramic substrate and the housing to minimize hysteresis of the sensor, and
the film material compresses from 3 mils to 1 mil when 350 degrees F. temperature is applied for 10 minutes using a thermoset process.

* * * * *